(12) United States Patent
Do et al.

(10) Patent No.: US 9,020,018 B2
(45) Date of Patent: Apr. 28, 2015

(54) SYSTEMS FOR CALIBRATION OF WIRELESS ELECTRONIC DEVICES

(75) Inventors: Gary Lang Do, San Jose, CA (US); David A. Donovan, Oakland, CA (US); Gurusubrahmaniyan Radhakrishnan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 204 days.

(21) Appl. No.: 13/523,699

(22) Filed: Jun. 14, 2012

(65) Prior Publication Data

US 2013/0336376 A1 Dec. 19, 2013

(51) Int. Cl.
*H04B 3/46* (2006.01)

(52) U.S. Cl.
CPC ...................................... *H04B 17/13* (2015.01)

(58) Field of Classification Search
CPC ..... H04L 1/20; H04L 1/0009; H04L 27/2647; H04L 1/24; H04L 1/0003; H04L 1/0071; H04L 5/0007; H04L 27/0008; H04B 17/00; H04B 17/006; H04B 17/005; H04B 3/46; H04B 17/0042; H04B 17/004
USPC .......... 375/327, 346, 376; 455/76, 78, 86, 84, 455/323, 313, 260; 327/157, 427, 437, 552
See application file for complete search history.

(56) References Cited

U.S. PATENT DOCUMENTS

| | | | |
|---|---|---|---|
| 8,081,710 B2 | 12/2011 | Carey | |
| 8,085,175 B2 | 12/2011 | Velazquez | |
| 8,140,031 B2 | 3/2012 | Tsfati et al. | |
| 8,170,507 B2 | 5/2012 | Wang et al. | |
| 8,170,819 B2 | 5/2012 | Raghavan et al. | |
| 8,195,105 B1 | 6/2012 | Erickson | |
| 2008/0309405 A1* | 12/2008 | Young et al. | 330/149 |
| 2009/0298440 A1* | 12/2009 | Takeya et al. | 455/67.14 |
| 2010/0119008 A1 | 5/2010 | Pal | |
| 2011/0170630 A1* | 7/2011 | Silverman et al. | 375/296 |
| 2012/0252382 A1* | 10/2012 | Bashir et al. | 455/114.3 |

* cited by examiner

*Primary Examiner* — Zewdu Kassa

(74) *Attorney, Agent, or Firm* — Treyz Law Group; Louis R. Levenson; Michael H. Lyons

(57) ABSTRACT

A calibration system may be provided for calibrating wireless communications circuitry in an electronic device during manufacturing. The calibration system may include data acquisition equipment and calibration computing equipment for receiving and processing test and calibration signals from wireless communications circuitry to be calibrated. During testing and calibration operations, a device may be provided with initial pre-distortion calibration values. The initial pre-distortion calibration values may be generated at least in part based on calibration operations performed for other wireless electronic devices. The device may generate a test signal using the initial pre-distortion calibration values. The calibration system may determine whether the test signal is within an acceptable range of a known reference signal. If the test signal is outside of the acceptable range, the calibration system may generate a set of corrected pre-distortion calibration values to be used in generating wireless communications signals during normal operation of the device.

23 Claims, 14 Drawing Sheets

SYSTEMS FOR CALIBRATION OF WIRELESS ELECTRONIC DEVICES

BACKGROUND

This related to calibration, and more particularly, to calibration of wireless communications circuitry in electronic devices.

Electronic devices such as portable computers and cellular telephones are often provided with wireless communications capabilities. For example, electronic devices may use long-range wireless communications circuitry such as cellular telephone circuitry to communicate using cellular telephone bands at 700 MHz, 850 MHz, 900 MHz, 1800 MHz, 1900 MHz, and 2100 MHz. Electronic devices may use short-range wireless communications circuitry to handle communications with nearby equipment. For example, electronic devices may communicate using the WiFi® (IEEE 802.11) bands at 2.4 GHz and 5 GHz and the Bluetooth® band at 2.4 GHz.

Wireless communications circuitry often includes a power amplifier that amplifies an electronic input signal to produce an amplified electronic output signal having more power than the input signal. The ratio of power of the output signal to the power of the input signal is commonly referred to as the gain of an amplifier. Power amplifiers commonly introduce non-linear distortions into an output signal such as distortions in signal power and signal phase as a function of input power. To compensate for this and other distortions of a signal by a power amplifier, wireless communications circuitry often includes a pre-distortion compensator circuit that alters an input signal to the power amplifier such that the output of the power amplifier is linear for a broader range of input signal powers. Pre-distortion compensator circuits use a set of stored pre-distortion coefficients that are based on measured performance of the power amplifier.

In order to provide electronic devices that perform uniformly across all devices, each electronic device may be calibrated during manufacturing before delivery to end users. Calibration operations include determination of pre-distortion coefficients for each device by measuring the performance of wireless communications power amplifiers in each device. Generating pre-distortion coefficients individually for each electronic device can be time consuming and can therefore slow the pace of production of the devices and can increase the cost of productions.

It would therefore be desirable to provide improved calibration systems for electronic devices with wireless communications capabilities.

SUMMARY

A calibration system may be provided for calibrating wireless communications circuitry in an electronic device during manufacturing.

An electronic device may have wireless communications circuitry for handling wireless communications. The wireless communications circuitry may include transceiver circuitry and a power amplifier. The transceiver may include a pre-distortion compensator for pre-processing a signal to the power amplifier. The calibration system may be used to generate pre-distortion calibration values that allow the pre-distortion compensator to pre-process the signal to the power amplifier such that the output signal from the power amplifier is a linear function of the input signal to the pre-distortion compensator.

The calibration system may be used to generate a set of initial pre-distortion calibration values for a population of electronic devices such as a particular model of cell phone, tablet computer, laptop computer, etc. The calibration system may generate the initial pre-distortion calibration values by observing power amplifier performance of additional power amplifiers having similar properties to the power amplifier in the wireless communications circuitry to be calibrated. If desired, power amplifier performance of the additional power amplifiers may be observed prior to installation of the power amplifiers in a device or by gathering information about pre-distortion values that have been generated for power amplifiers in previously calibrated devices within a population of devices.

During calibration operations, the initial calibration values may be provided to an electronic device to be calibrated. Pre-distortion calibration operations may then be performed for that device using the provided initial calibration values. Pre-distortion calibration operations may include testing power amplifier performance using the initial calibration values and determining whether power amplifier performance using the initial calibration values is within an acceptable range (e.g., by determining whether a signal generated using the initial calibration values is within an acceptable range of a reference signal).

In response to determining that power amplifier performance using the initial calibration values is within the acceptable range, calibration operations for that device may be terminated without generating any additional pre-distortion calibration values for that particular device.

In response to determining that power amplifier performance using the initial calibration values is outside the acceptable range, further calibration operations may be performed to generate a set of corrected pre-distortion calibration values for that device.

If desired, pre-distortion values for multiple devices may be accumulated by the calibration system and used to periodically generate an updated set of initial pre-distortion calibration values to be used during subsequent calibration operations for other devices.

Further features of the invention, its nature and various advantages will be more apparent from the accompanying drawings and the following detailed description of the preferred embodiments.

DETAILED DESCRIPTION

Electronic devices such as cellular telephones, media players, computers, set-top boxes, wireless access points, and other electronic equipment having wireless communications circuitry may be calibrated during manufacturing.

Wireless communications circuitry is often able to support multiple radio access technologies. For example, a device may include wireless communications circuitry for handling communications associated with "2G", "3G" and "4G" communications protocols. Wireless communications circuitry may include capabilities for handling communications using cellular telephone protocols, WiFi® (IEEE 802.11) communications protocols, Bluetooth® communications protocols, etc. Wireless communications using these communications protocols may be implemented using by modulating a carrier signal using a phase-shift keying (PSK) modulation scheme. A calibration system including calibration computing equipment and data acquisition equipment capable of receiving and processing PSK modulated signals (e.g., Global System for Mobile communication (GSM) 8PSK modulated signals) may be used during calibration of devices. Following calibration, a device may be shipped to a customer.

Figure 1:
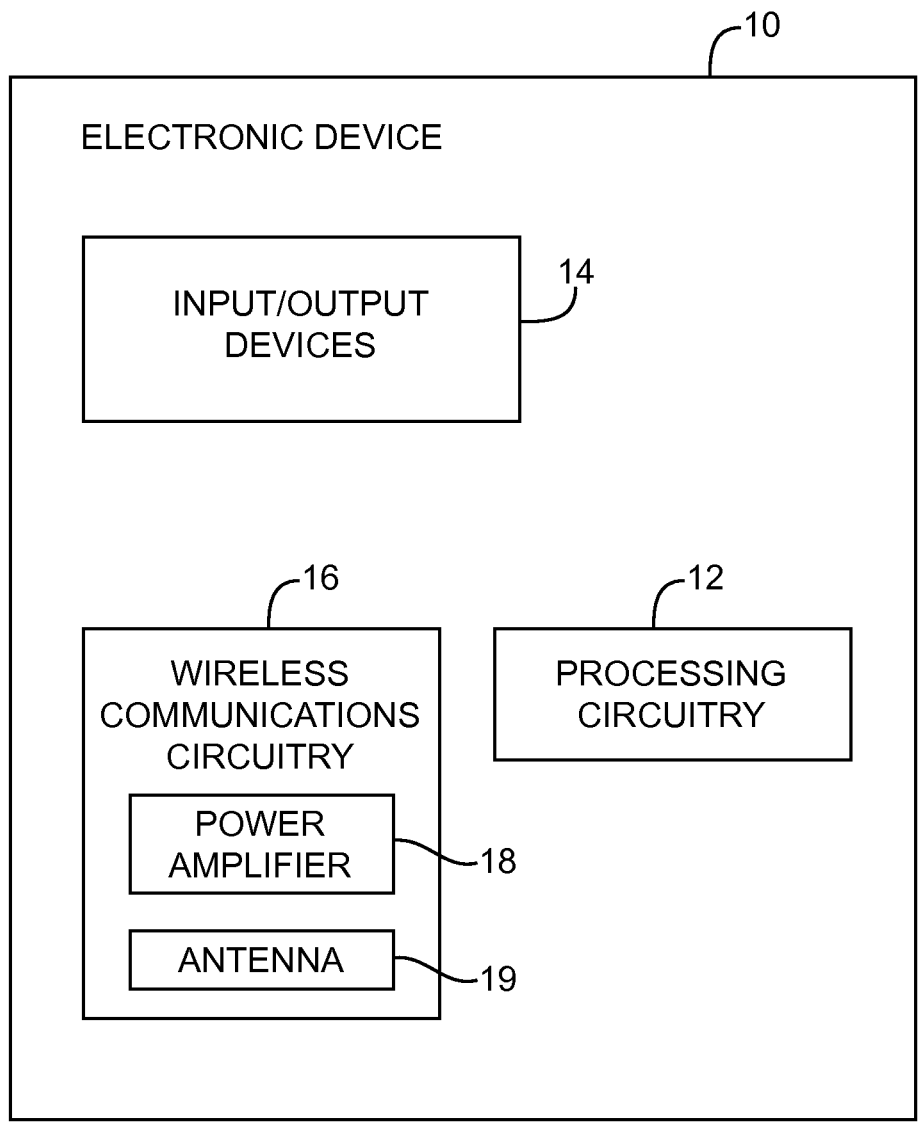
FIG. 1 is a diagram of an illustrative electronic device having wireless communications circuitry in accordance with an embodiment of the present invention.

An illustrative electronic device of the type that may be calibrated during manufacturing is shown in FIG. 1. As shown in FIG. 1, electronic device 10 may include processing circuitry 12, input-output devices 14, and wireless communications circuitry 16. Processing circuitry 12 may include microprocessors, microcontrollers, digital signal processor integrated circuits, application-specific integrated circuits, and other processing circuitry. Volatile and non-volatile memory circuits such as random-access memory, read-only memory, hard disk drive storage, solid state drives, and other storage circuitry may also be included in processing circuitry 12.

Processing circuitry 12 may use input-output devices 14 to obtain user input and to provide output to a user. Input-output devices 14 may include speakers, microphones, sensors, buttons, keyboards, displays, touch sensors, wireless circuitry such as wireless local area network transceiver circuitry and cellular telephone network transceiver circuitry, and other components for receiving input and supplying output.

Wireless communications circuitry 16 may include one or more power amplifiers such as power amplifier 18. Wireless communications circuitry 16 may include transceiver circuitry for handling communications at the GPS frequency of 1575 MHz, cellular telephone communications (e.g., communications in cellular bands at 700, 800, 900, 1800 1900, and 2100 MHz) or wireless local area network communications (e.g., in bands at 2.4 GHz or 5 GHz). Transceiver circuitry associated with wireless circuitry 16 may include or be associated with circuits such as low-noise amplifiers (LNAs) that are used to amplify incoming signals and power amplifiers such as power amplifier 18. Power amplifier 18 may be used to amplify outgoing signals. Transceiver circuitry associated with wireless circuitry 16 may include storage and processing circuitry and may communicate with other storage and processing circuitry in device 10. Storage may be used to store software code or calibration values such as pre-distortion coefficients obtained during calibration operations for device 10.

Wireless communications circuitry 16 may include one or more antennas such as antenna 19. Antenna 19 may be formed using any suitable type of antenna. For example, antenna 19 may include antennas with resonating elements that are formed from loop antenna structures, patch antenna structures, inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link antenna (e.g., for handling WiFi® traffic or other wireless local area network traffic) and another type of antenna may be used in forming a remote wireless link antenna (e.g., for handling cellular network traffic such as voice calls and data sessions). There may be multiple antennas in device 10. These antennas may be fixed or may be tunable.

Figure 2A:
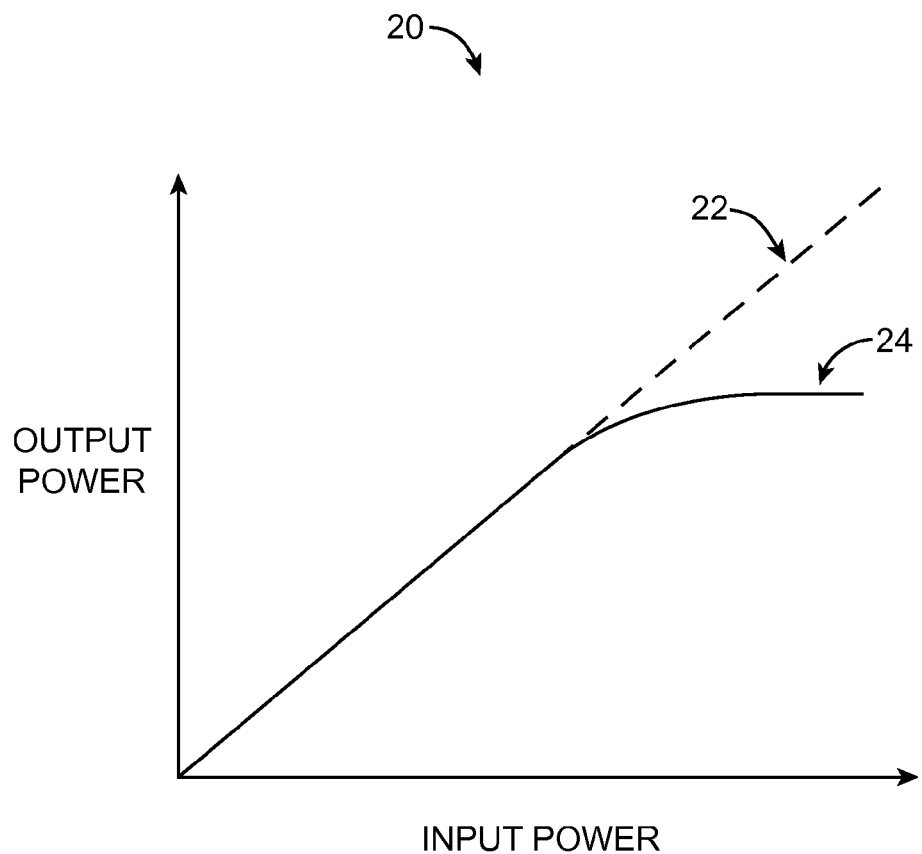
FIG. 2A is a graph of power amplifier performance for a typical power amplifier.

Power amplifiers such as power amplifier 18 often exhibit non-linear amplification of input signals as shown in FIG. 2A. Graph 20 of FIG. 2A shows how the amplified output power of a signal that is output from a common power amplifier changes with respect to the input power of a signal that is input to the power amplifier. A linear amplification (or constant gain) at all input powers is indicated by dashed line 22 (i.e., the slope of dashed line 22 is constant, thereby indicating a constant gain at any input power).

Solid line 24 shows that the actual output power of a common amplifier follows linear response curve 22 for relatively small input power. However, for input signals with relatively larger input power, the corresponding output power, as shown by real amplification curve 24, deviates from linear curve 22.

Power amplifiers may exhibit other distorting behavior. For example, in addition to distorting the amplitude of an input signal, a power amplifier may include capacitive or inductive components that affect output of portions of an input signal and thereby generate distortions in the phase of an input signal. Power amplifiers often distort the frequency of an input signal in addition to distortions of the amplitude and phase of the input signal. In order to compensate for these signal distorting effects (e.g., amplitude distortion, phase distortion, frequency distortion, etc.), an electronic device such as device 10 of FIG. 1 may be provided with wireless communications circuitry that includes pre-distortion circuitry that applies an inverse (e.g., compensating) distortion to the input signal to a power amplifier that cancels or reduces known (e.g., previously measured) power amplifier distortions to the signal.

Figure 2B:
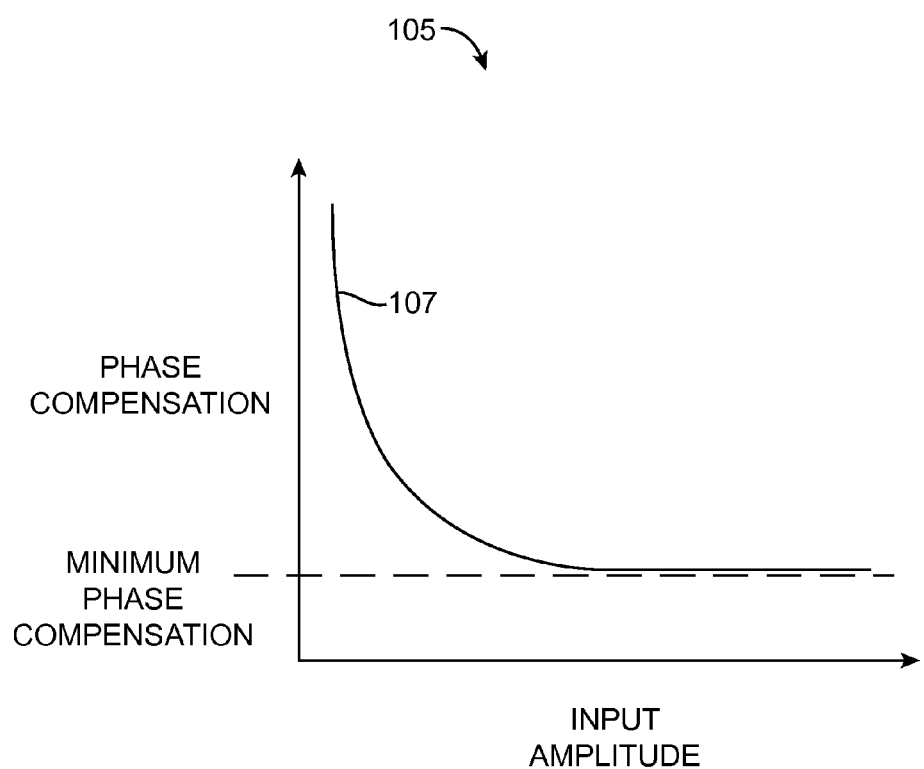
FIG. 2B is a graph showing how pre-distortion phase compensation of a typical power amplifier depends on the amplitude of an input signal.

FIG. 2B shows how the size of a pre-distortion compensation for correcting for phase distortion of a typical power amplifier varies with respect to the amplitude of the input signal to the power amplifier. As shown by phase compensation curve 107 of graph 105 of FIG. 2B, for relatively small input amplitudes, a typical power amplifier generates a large phase distortion and therefore may require a large phase compensation. For relatively larger input amplitudes, the phase compensation can be smaller and asymptote to a minimum phase compensation for very large input amplitudes.

Figure 3:
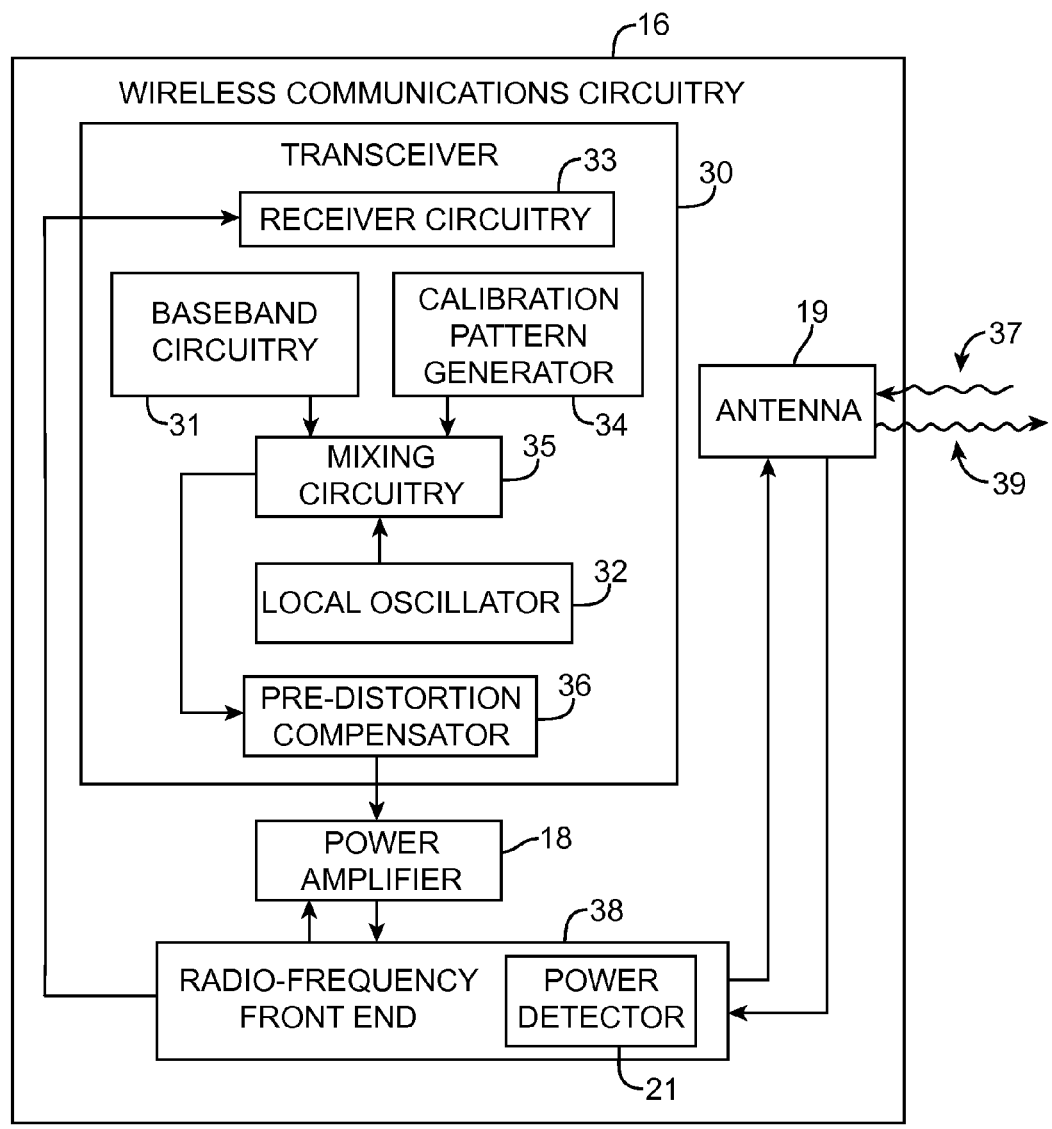
FIG. 3 is a diagram of illustrative wireless communications circuitry having a power amplifier and a transceiver with a pre-distortion compensator in accordance with an embodiment of the present invention.

Wireless communications circuitry of the type that may be provided with pre-distortion compensation circuitry is shown in FIG. 3. As shown in FIG. 3, an electronic device of the type shown in FIG. 1 may include wireless communications circuitry 16 having a transceiver such as transceiver 30 for use in transmitting and receiving radio-frequency (RF) signals. Transceiver 30 may include receiver circuitry such as receiver circuitry 33 that is coupled to one or more antennas such as antenna 19.

Receiver circuitry 33 of transceiver 30 may be used to process incoming signals such as incoming signal 37. Transceiver 30 may include one or more local oscillators such as local oscillator 32. Local oscillator 32 may be configured to generate a carrier signal that is mixed with a modulating data signal using mixing circuitry 35 prior to transmission of data using wireless communications circuitry 16.

During normal operations of device 10, data signals may be generated using baseband circuitry 31. Data signals generated with baseband circuitry 31 may be mixed with carrier signals generated by local oscillator 32. Mixing carrier signals generated by local oscillator 32 with data signals generated using baseband circuitry 31 may include modulating the carrier signal with the data signal. Modulating the carrier signal with the data signal may include any suitable type of carrier signal modulation (e.g., amplitude modulation, frequency modulation, phase modulation, etc.). Modulating carrier signals with data signals using digital in-phase/quadrature-phase (I/Q) phase-shift-keying (PSK) is sometimes described herein as an example.

As shown in FIG. 3, transceiver 30 may be coupled to power amplifier 18. Power amplifier 18 may be used to amplify a signal generated by transceiver 30 prior to transmission of the signal using a radio-frequency front end such as RF front end 38 and one or more antennas such as antenna 19. Signals such as transmitted signal 39 may be transmitted using antenna 19. Antenna 19 may be formed separately from RF front end 38 or may be formed as a portion of RF front end 38. RF front end 38 may include one or more integrated circuits for performing filtering, low-noise amplification, frequency conversion, etc. of received RF signal 37 and transmitted RF signal 39.

If desired, RF front end 38 may be associated with a power detector such as power detector 21. Power detector 21 and power amplifier 18 may form a portion of a power feedback loop (e.g., a power feedback loop internal to device 10, a power feedback loop that uses communications with an external network, etc.) for determining a desired amount of amplification by power amplifier 18. For example, RF front end 38 and power detector 21 may form a portion of a power control feedback loop (e.g., open loop power control, closed loop power control, etc.) in which the detected power of received RF signal 37 is used to determine a desired level of power amplification by power amplifier 18. Power detector 21 may be formed separately from RF front end 38 or may be formed as an integrated portion of RF front end 38.

As shown in FIG. 3, transceiver 30 may include a pre-distortion compensator such as pre-distortion compensator 36 (also sometimes referred to herein as pre-distortion compensation circuitry, pre-distortion circuitry, etc.). Pre-distortion compensator 36 may be configured to compensate for distortions of a signal by power amplifier 18 (e.g., to alter a signal generated by transceiver 30 such that, following amplification using power amplifier 18, the signal generated by transceiver 30 is substantially undistorted).

As an illustrative example of pre-distortion compensation for power amplifier distortion of a signal, transceiver 30 may generate a signal having a low power (small amplitude) component PL (power low) and a high power (large amplitude) component PH (power high). Power amplifier 18 may amplify low power component PL by a gain factor g such that the output signal from power amplifier 18 corresponding to low power component PL has an output power PO=g*PL. Power amplifier 18 may have a non-linear (distorting) amplification for high power input signals. Therefore, power amplifier 18 may amplify high power component PH by a gain factor (for example) 0.5*g such that the output signal from power amplifier 18 corresponding to high power component PH is only PO=0.5*g*PH. In this example, pre-distortion compensator 36 may be configured to boost (e.g., increase the amplitude) high power component PH by a factor of 2 prior to amplification by power amplifier 18 so that the output signal from power amplifier 18 corresponding to pre-distorted high power component PH_pdist=2.0*PH is PO=0.5*g*PH_pdist=g*PH. In this way, a linear gain may be applied to input signals PL and PH. This example is merely illustrative.

In practice, power amplifier 18 may have more complicated distorting effects on an input signal (e.g., frequency distortion, phase distortion, etc.). Pre-distortion compensator 36 may be configured to pre-distort an input signal to power amplifier 18 to compensate for these more complicated effects. Pre-distortion compensator 36 may be configured to pre-distort the input signal in a way that inverts the distortions of power amplifier 18 so that the output signal from power amplifier 18 includes minimized distortions in amplitude, frequency, and/or phase. In order to provide device 10 with transceiver circuitry having pre-distortion compensators such as pre-distortion compensator 36 that compensate for signal distortion by associated power amplifiers, the signal distortion exhibited by the power amplifier may first be measured (e.g., the power amplifier output may be calibrated) and information about that distortion may be stored in the device in the form of pre-distortion calibration values.

Pre-distortion calibration values (sometimes referred to herein as pre-distortion coefficients or pre-distortion calibration coefficients) may be stored by device 10 in memory associated with transceiver 30, or other memory associated with wireless circuitry 16. During normal operation of a device such as device 10, pre-distortion compensator 36 may use pre-distortion coefficients to pre-distort signals generated by mixing circuitry 35 prior to signal amplification by power amplifier 18. During normal operation of device 10, power detector 21 may be used to detect the power of a signal (e.g., an amplified signal from power amplifier 18, an incoming signal such as incoming signal 37, etc.). Power detector 21 may be used as a portion of an open loop or closed loop power control system that adjusts the amount of amplification by power amplifier 18 depending on the detected power the signal.

Pre-distortion calibration values may be determined for each device by measuring signal distortion exhibited by the power amplifier. The signal distortion exhibited by the power amplifier may be measured during calibration and testing operations performed during manufacturing of the device. Calibration and testing operations may include generating a known unamplified calibration signal, amplifying the known unamplified calibration signal using the power amplifier, transmitting the amplified calibration signal to a calibration system, and comparing the transmitted signal to a known reference signal.

If desired, some or all of the calibration and testing operations may be performed prior to integration of power amplifier with wireless communications circuitry 16 and transceiver 30 (e.g., by generating the known unamplified calibration signal using a waveform generator in the calibration system). However, this is merely illustrative. As shown in FIG. 3, in order to measure signal distortion caused by a power amplifier such as power amplifier 18, transceiver circuitry 30 may be provided with circuitry for generating a predetermined signal having a known amplitude-modulated calibration pattern.

In the example of FIG. 3 transceiver circuitry 30 is provided with calibration pattern generator 34 for generating the known amplitude-modulated calibration pattern. During calibration operations, the known amplitude-modulated calibration pattern may, for example, be mixed with a carrier signal from local oscillator 32 to form the known unamplified calibration signal. The known unamplified calibration signal may include in-phase and quadrature phase (I/Q) components.

During calibration operations, pre-distortion compensator 36 may be provided with a set of initial pre-distortion calibration values. The known unamplified calibration signal may be pre-distorted by pre-distortion compensator 36 using the initial pre-distortion calibration values. The pre-distorted unamplified calibration signal may then be amplified by power amplifier 18 to form an amplified amplitude-modulated calibration signal.

The amplified amplitude-modulated calibration signal may be transmitted to a calibration system using RF front end 38 and antenna 19 of device 10 or using an RF front end and antenna that are part of a test platform in a calibration system. Generating a calibration signal using a pre-distorted unamplified calibration signal may help reduce the time required for wireless calibration of an electronic device. For example, if the amplified amplitude-modulated calibration signal that was generated using the initial pre-distortion calibration values is within an acceptable range of a known reference signal, the device may be shipped to a consumer without performing any further calibration operations. However, this is merely illustrative. In some situations, residual power amplifier distortions may exist in an amplified amplitude-modulated calibration signal that was generated using the initial pre-distortion calibration values.

The initial pre-distortion calibration values may be values determined based on previous power amplifier signal distortion measurements performed for a population of similar electronic devices or similar power amplifier and transceiver configurations. For example, the initial pre-distortion calibration values may be a set of statistically-derived calibration values such as average or median pre-distortion calibration values that were used to calibrate some or all previously manufactured similar devices or similar power amplifier and transceiver configurations.

If desired, initial calibration values such as average calibration values for a population of devices may be adjusted using characteristics of test signals generated using the power amplifiers for that population of devices. For example, parametric characteristics of the test signals such as the modulation power spectral density (PSD), transient PSD, error vector magnitude (EVM), phase errors or other parametric characteristics of the test signals may be extracted from the test signals and used to adjust the initial calibration values.

The modulation PSD may, for example, describe the amount of periodic amplitude modulations of various sizes in the test signals associated with each power amplifier. Initial calibration values may be computed, as an example, by computing a pre-distortion calibration curve based more heavily on portions of the test signal for a given power amplifier that are near the peak of the modulation PSD of the test signal for that power amplifier. However, this is merely illustrative. If desired, the initial pre-distortion calibration values may be determined using power amplification characteristics, parametric (statistical) characteristics or a combination of power amplification characteristics and parametric characteristics of test signals generated using power amplifiers.

Due to manufacturing differences between circuitry in a current device to be calibrated and circuitry in other devices, an amplified signal generated by a device using the initial pre-distortion calibration values may still include residual signal distortions induced by the power amplifier in that device. These potential residual power amplifier distortions may be corrected by generating corrected pre-distortion calibration values during subsequent calibration and testing operations.

Figure 4:
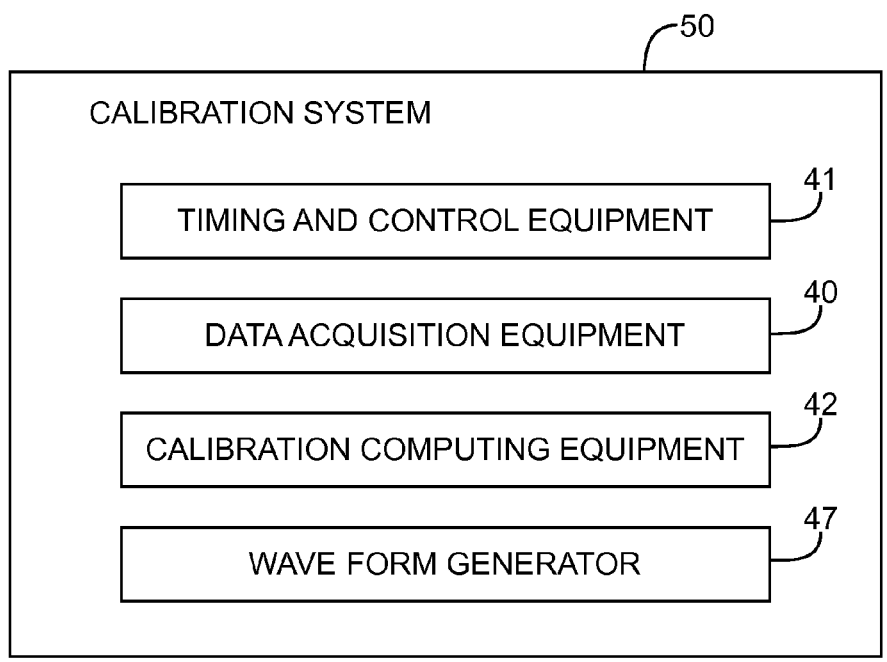
FIG. 4 is a diagram of an illustrative calibration system for determining pre-distortion calibration values for a wireless electronic device in accordance with an embodiment of the present invention.

FIG. 4 is a diagram of an illustrative calibration system that may be used in calibrating devices such as device 10. As shown in FIG. 4, calibration system 50 may include timing control equipment 41 and signal receiving and processing equipment such as data acquisition equipment 40. Data acquisition equipment 40 may be coupled to computing equipment such as calibration computing equipment 42.

Timing control equipment 41 may include external computing equipment configured to initiate calibration operations. Data acquisition equipment 40 may include wireless communications circuitry such as antennas, oscillators and mixers for receiving amplified calibration signals from wireless communications circuitry 16 of device 10. Radio-frequency calibration signals may be captured by data acquisition equipment 40 and converted to data samples such as in-phase/quadrature-phase (I/Q) data samples by data acquisition equipment 40.

A calibration signal may be represented in polar space as in-phase (I) and quadrature phase (Q) components. The amplitude of a signal may be expressed in I/Q space components as shown by the following equation:

$$\text{AMPLITUDE} = \text{SQRT}(I^2 + Q^2), \quad (1)$$

where SQRT( ) indicates the square root function. The phase of a calibration signal may be expressed in I/Q space components as shown by the following equation:

$$\text{PHASE} = \arctan(Q/I), \quad (2)$$

where arctan( ) represents the arctangent function. Equations 1 and 2 may be used to convert detected amplitude and phase samples of a received calibration signal to I/Q space data samples (i.e., from an amplitude/phase representation of data to an I/Q representation of the data).

Data samples such as I/Q data samples may be transferred to calibration computing equipment 42. If desired, data acquisition equipment 40 may perform verification and/or testing of received calibration signals and/or I/Q data samples prior to transfer to calibration computing equipment 42.

Calibration system 50 may include additional devices such as waveform generator 47. Waveform generator 47 may be used to generate a known pre-amplified calibration signal to be amplified using a power amplifier to be calibrated. Waveform generator 47 may be used, for example, in situations in which test data based on test signals from a power amplifier and radio-frequency front end such as power amplifier 18 and RF front end 38 of FIG. 3 is to be gathered prior to integration with transceiver circuitry in an electronic device (e.g., test data for determining a set of initial pre-distortion calibration values).

Figure 5:
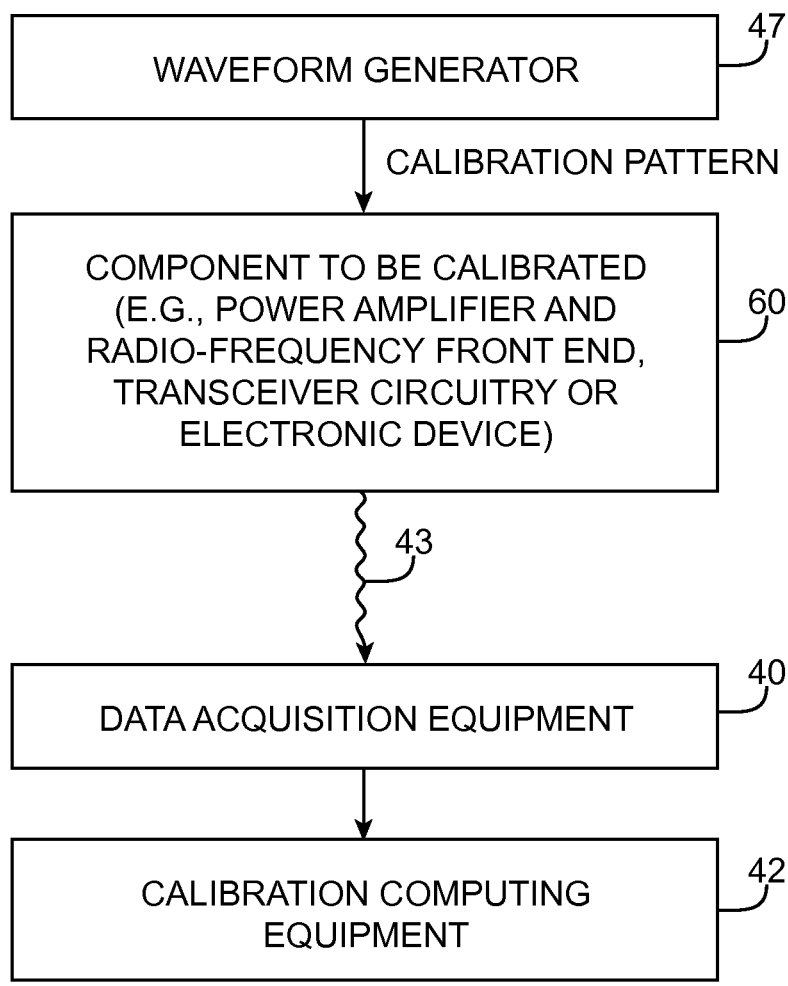
FIG. 5 is an illustrative diagram showing how a calibration system of the type shown in FIG. 4 may be used to determine a set of initial pre-distortion calibration values for a population of electronic devices in accordance with an embodiment of the present invention.

As shown in FIG. 5, during a portion of calibration and testing operations, waveform generator 47 may be used to generate a known calibration pattern to be provided to a component such as component 60 to be calibrated. Component 60 may be a power amplifier and radio-frequency front end, a power amplifier and radio-frequency front end that are integrated onto a transceiver circuit board, or a power amplifier and radio-frequency front end that are fully integrated into wireless communications circuitry of an assembled electronic device such as device 10.

A power amplifier in component 60 may be used to amplify a calibration signal that includes the known calibration signal generated by waveform generator 47. An amplified calibration signal such as signal 43 may be transmitted to data acquisition equipment 40. Received signal 43 may be processed and used in generating a set of initial pre-distortion calibration values for a population of devices with components 60.

If desired, waveform generator 47 may be used to provide the known calibration pattern to many components 60 (e.g., tens, hundreds, thousands, hundreds of thousands, or millions of components 60) to be used in a given population of electronic devices. Test signals such as signal 43 generated by those components 60 may be processed and used to generate the initial pre-distortion values for that population of components. Those initial pre-distortion calibration values may be used in calibration and testing operations for each device with a component 60 once those components 60 have been integrated into assembled or partially assembled electronic devices such as device 10.

Figure 6:
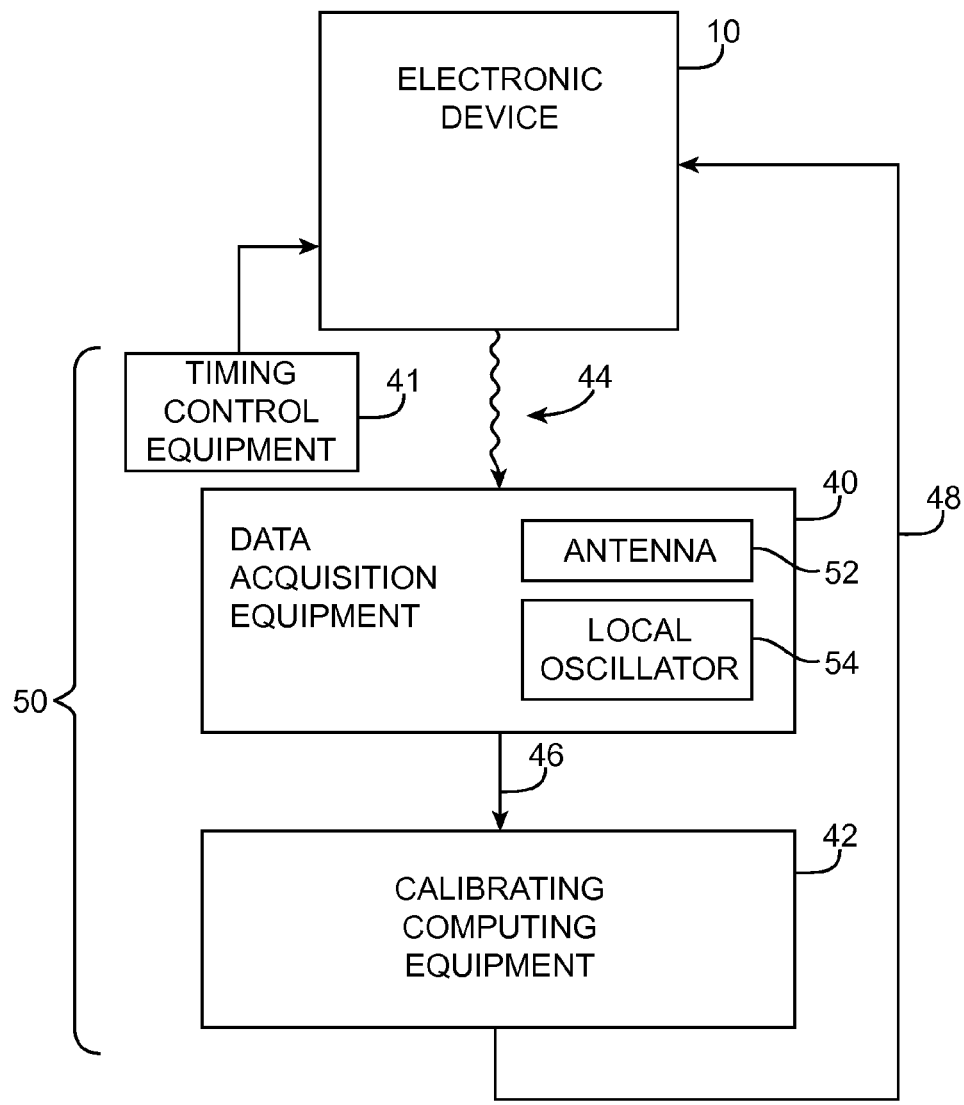
FIG. 6 is an illustrative diagram showing how a calibration system of the type shown in FIG. 4 may be used to perform testing and calibration operations for an electronic device in accordance with an embodiment of the present invention.

As shown in FIG. 6, pre-distortion calibration values such as initial pre-distortion calibration values may be provided to electronic device 10 over path 48 prior to performing individual calibration and testing operations for device 10. Wireless communications circuitry in device 10 may then be used to generate a pre-distorted amplified calibration signal such as signal 44 having a known calibration pattern using the initial pre-distortion calibration values as described above in connection with FIG. 3.

Timing control equipment 41 may then be used to precisely control the time at which pre-distorted amplified calibration signal 44 is transmitted from device 10 to data acquisition equipment 40. Data acquisition equipment 40 may include one or more antennas such as antenna 52. Data acquisition equipment 40 may use antenna 52 to receive signal 44 during calibration operations. Data acquisition equipment 40 may include a local oscillator such as local oscillator 54 that produces a signal at a frequency that is substantially similar to the frequency of the carrier signal produced by local oscillator 32 of device 10. Local oscillator 54 of data acquisition equipment 40 may be used to generate a signal to be mixed with received signal 44 (e.g. the calibration signal carrying the known calibration pattern) so that calibration data may be extracted from signal 44.

Data acquisition equipment 40 and/or calibration computing equipment 42 may be used to overcome potential relative local oscillator frequency drift between oscillator 32 and oscillator 54 by including an un-modulated frequency locking component in communicated data or by extracting frequency locking information from amplitude-modulated pre-distorted calibration data (i.e., without requiring transfer of un-modulated frequency locking data).

Signal 44 may be captured and converted to in-phase/quadrature-phase (I/Q) data samples by data acquisition equipment 40. I/Q data samples may be transferred to calibration computing equipment 42 along path 46. Path 46 may be a wired or wireless communications path. As examples, data acquisition equipment 40 and calibration computing equipment 42 may be connected by a path 46 that includes one or more General Purpose Interface Bus (GPIB) cables and/or one or more Ethernet cables.

Pre-distortion calibration data (e.g., I/Q data samples) that is transferred from data acquisition equipment 40 to calibration computing equipment 42 may be processed using calibration computing equipment 42. Calibration computing equipment 42 may be used to compare the pre-distortion calibration data to a set of known reference data. If the pre-distortion calibration data is determined to be within an acceptable range of the reference data (e.g., if calibration signal 44 is within an acceptable range of a known reference signal), calibration and testing operations may be terminated without generating any individual pre-distortion calibration values for the device. Providing devices such as device 10 with initial pre-distortion calibration values in this way may therefore significantly reduce the overall time used in performing wireless calibration for a population of devices.

If the pre-distortion calibration data for an individual device is determined to be outside the acceptable range of the reference data (e.g., if signal 44 is determined to be outside of the acceptable range of the known reference signal), calibration computing equipment 42 may be used to perform additional calibration operations for device 10. For example, calibration computing equipment 42 may be used to generate a set of corrected pre-distortion calibration values to be provided to device 10. The corrected pre-distortion calibration values that are provided to device 10 may be used by pre-distortion compensator 36 to pre-distort signals generated by mixing circuitry 35 prior to providing the pre-distorted signals to power amplifier 18 for amplification. In this way, amplifier induced distortion of signals transmitted using wireless communications circuitry 16 of device 10 may be minimized.

Generating the set of corrected pre-distortion calibration values using the calibration computing equipment may include measuring amplifier distortion in amplifier-distorted amplitude-modulated pre-distorted calibration data by comparing the calibration data to the known calibration pattern that was generated by calibration pattern generator (FIG. 3). Calibration computing equipment 42 may then extract the corrected pre-distortion coefficients from the results of the comparison of the phase drift corrected calibration data and the known input (reference) signal. Following extraction of the corrected pre-distortion coefficients from the calibration data, calibration computing equipment 42 may transmit the corrected pre-distortion coefficients along path 48 to transceiver 30 of device 10.

Pre-distortion coefficients measured during calibration of wireless communications circuitry 16 may be stored by device 10 in memory associated with transceiver 30 or in other memory associated with wireless circuitry 16. During normal operation of a device such as device 10, pre-distortion compensator 36 may use pre-distortion coefficients provided during calibration operations to pre-distort signals generated by transceiver 30 prior to signal amplification by power amplifier 18 so that the signal that has been amplified by power amplifier 18 has the same signal quality as the signal that is input to the pre-distorter.

Figure 7:
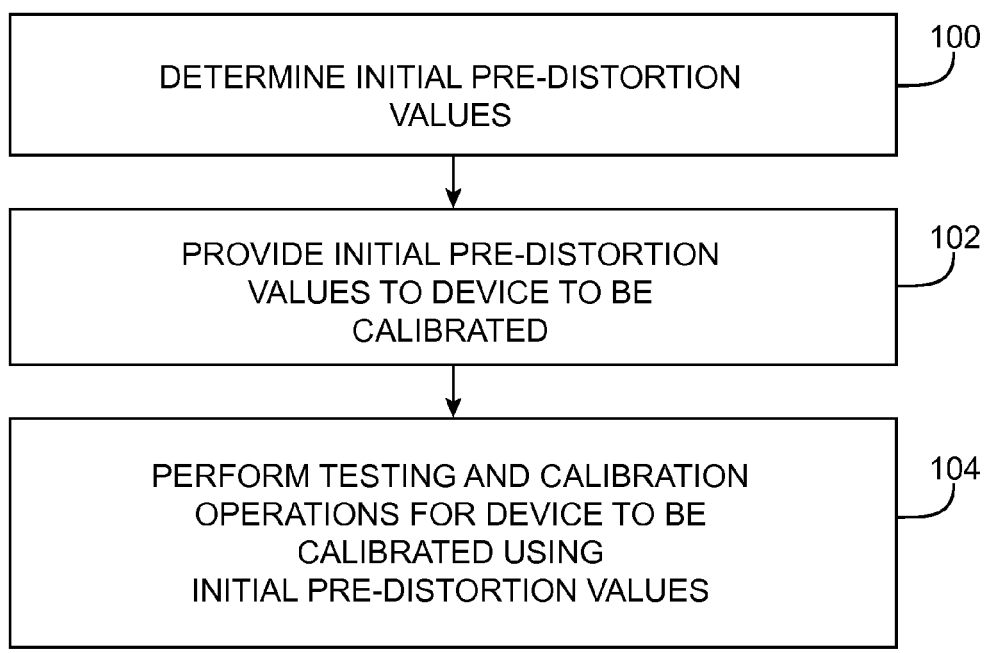
FIG. 7 is a flow chart of illustrative steps involved in performing wireless communications calibration of electronic devices having wireless communications circuitry using initial calibration values in accordance with an embodiment of the present invention.

To conduct wireless communications calibration of a device such as device 10 using a calibration system of the type shown in FIG. 4, the steps of the illustrative flowchart of FIG. 7 may be performed.

At step 100, a set of initial pre-distortion calibration values (initial pre-distortion values) may be determined. The initial pre-distortion calibration values may be determined, for example, by generating initial pre-distortion calibration values for a population of devices as described above in connection with FIGS. 3, 4 and 5.

At step 102, the initial pre-distortion calibration values may be provided to a device such as device 10 to be calibrated. The initial pre-distortion calibration values may be provided to device 10 as described above in connection with, for example, FIG. 6.

At step 104, testing and calibration operations for a device such as device 10 to be calibrated may be performed using the provided initial pre-distortion calibration values.

Figure 8:
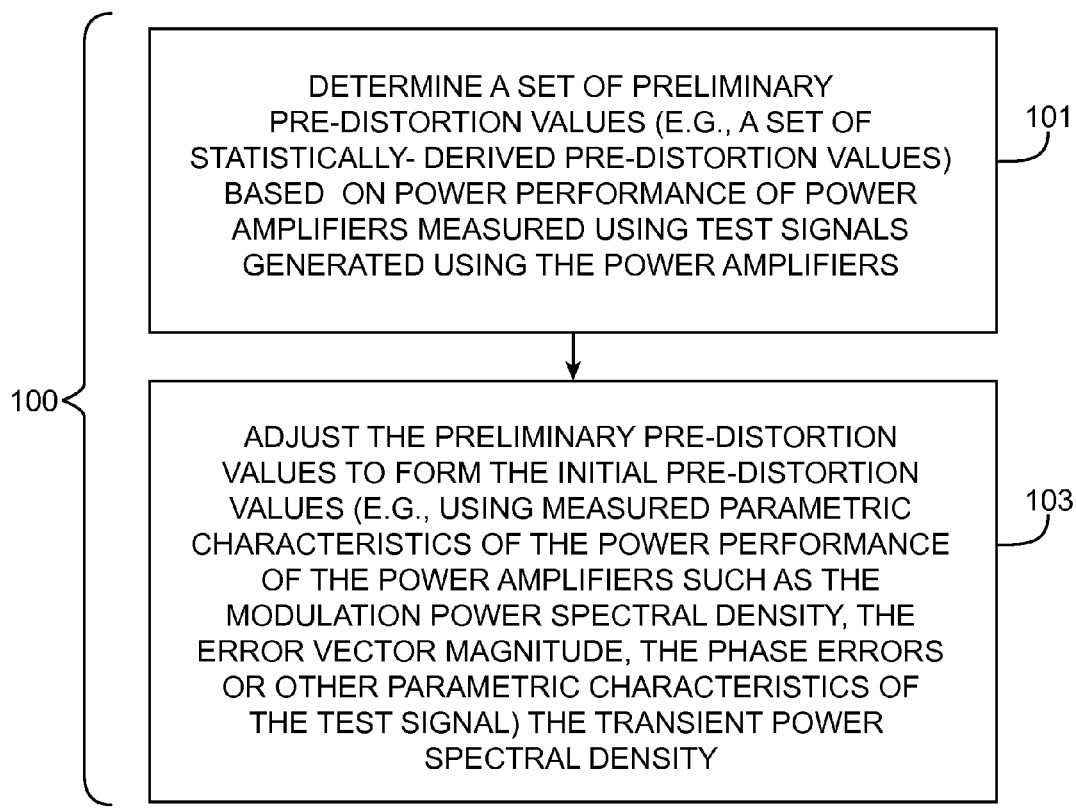
FIG. 8 is a flow chart of illustrative steps involved in determining a set of initial pre-distortion calibration values for a population of electronic devices having wireless communications circuitry in accordance with an embodiment of the present invention.

Illustrative steps that may be used in determining initial calibration values as described above in connection with step 100 of FIG. 7 are shown in FIG. 8.

At step 101, a set of preliminary pre-distortion calibration values for a population of wireless electronic devices may be determined. The preliminary pre-distortion calibration values may, for example, be a set of statistically-derived pre-distortion calibration values (e.g., average calibration values) determined based on observed power performance of additional power amplifiers to be used in that population of electronic devices. The power performance of the additional power amplifiers may be observed using a test signal such as signal 43 of FIG. 5.

As examples, the average pre-distortion calibration values may be determined by determining a set of pre-distortion calibration values for each additional power amplifier and averaging the determined sets of pre-distortion calibration values or by computing an average test signal from multiple test signals generated using the additional power amplifiers and determining the average pre-distortion calibration values using the computed average test signal (e.g., by fitting a pre-distortion calibration curve to the data associated with the average test signal).

At step 103, the preliminary pre-distortion calibration values may be adjusted to form the set of initial pre-distortion calibration values. Adjusting the preliminary pre-distortion calibration values may include measuring parametric characteristics of test signals such as signal 43 and computing the initial pre-distortion calibration values using the measured parametric characteristics and the test signals. Measuring the parametric characteristics of a test signal may include measuring a modulation power spectral density (PSD), a transient PSD, an error vector magnitude (EVM), phase errors or other parametric characteristics of the test signal.

Computing the initial pre-distortion calibration values using the measured parametric characteristics and the test signals may include modifying each of multiple test signals generated using the additional power amplifiers using the parametric characteristics extracted from that test signal (e.g., by multiplying a signal data or signal distortion data for a given power amplifier by the peak envelope power for the test signal generated using that power amplifier).

Computing the initial pre-distortion calibration values using the measured parametric characteristics may include computing new initial pre-distortion calibration values or modifying the preliminary pre-distortion calibration values computed at step 101. If desired, the initial pre-distortion calibration values may be determined using power amplification characteristics as described in connection with step 101, using parametric (statistical) characteristics as describe in connection with step 103, or using a combination of power amplification characteristics and parametric characteristics of test signals generated using power amplifiers as described in connection with steps 101 and 103.

Figure 9:
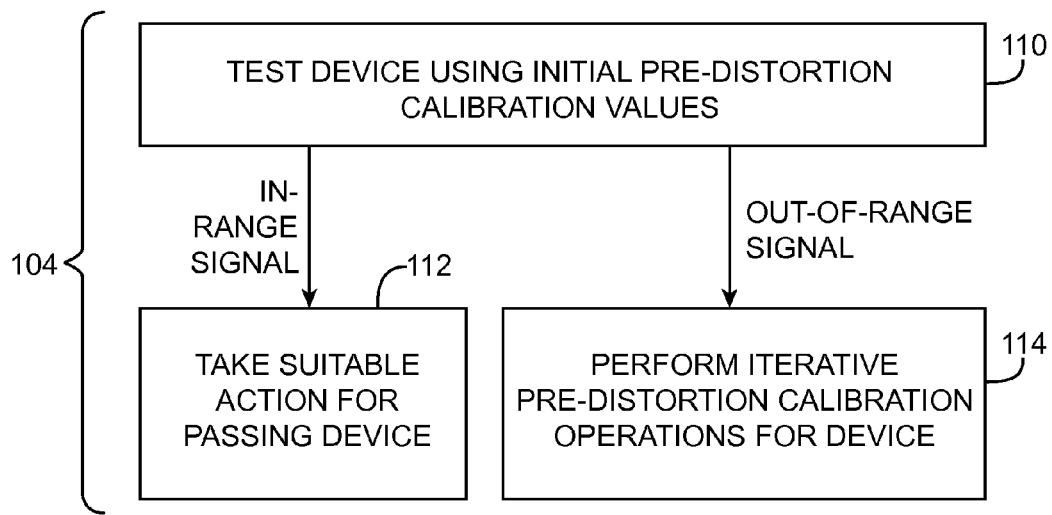
FIG. 9 is a flow chart of illustrative steps involved in performing wireless communications testing and calibration operations for electronic devices having wireless communications circuitry in accordance with an embodiment of the present invention.

Illustrative steps that may be used in performing the testing and calibration operations described above in connection with step 104 of FIG. 7 are shown in FIG. 9.

At step 110, a device such as device 10 may be tested using the initial pre-distortion calibration values. Testing device 10 using the initial pre-distortion calibration values may include determining whether a calibration signal generated by device 10 using the initial pre-distortion calibration values is within an acceptable range of a known reference signal. In response to determining that the calibration signal generated by device 10 using the initial pre-distortion calibration values is within the acceptable range of the known reference signal, calibration system 50 may proceed to step 112.

At step 112, suitable action may be taken for a passing device. Suitable action for a passing device may include terminating calibration and testing operations without generating any additional individualized pre-distortion calibration values for device 10. Providing devices such as device 10 with initial pre-distortion calibration values in this way may therefore significantly reduce the overall time used in performing wireless calibration for a population of devices. If desired, suitable action for a passing device may include shipping device 10 to an end-user with the initial pre-distortion calibration values stored in device 10.

In response to determining that the calibration signal generated by device 10 using the initial pre-distortion calibration values is outside the acceptable range of the known reference signal (i.e., that the calibration signal includes an unacceptable amount of residual power amplifier induced signal distortion), calibration system 50 may proceed to step 114.

At step 114, pre-distortion calibration operations such as iterative pre-distortion calibration operations may be performed for the device.

Figure 10:
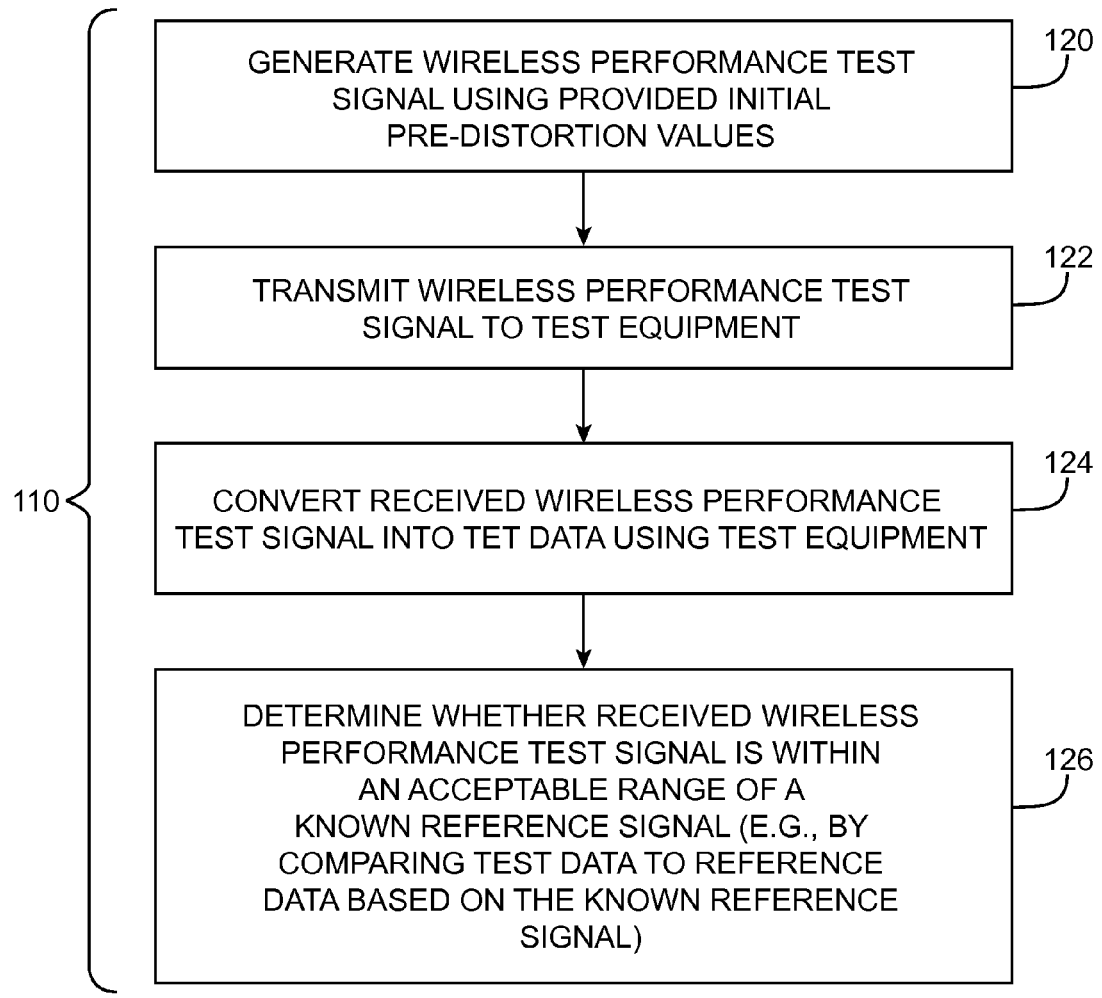
FIG. 10 is a flow chart of illustrative steps involved in performing power amplifier performance testing of electronic devices having wireless communications circuitry using initial pre-distortion calibration values in accordance with an embodiment of the present invention.

Illustrative steps that may be used in performing the testing operations described above in connection with step 110 of FIG. 9 are shown in FIG. 10.

At step 120, a wireless performance test signal may be generated by wireless communications circuitry in a device such as device 10 using the provided initial pre-distortion calibration values. The initial pre-distortion calibration values may be used by pre-distortion compensation circuitry such as pre-distortion compensator 36 (FIG. 3) to pre-distort a test signal prior to amplification of the test signal.

At step 122, the wireless performance test signal may be transmitted to test equipment in a calibration system such as system 50 of, for example, FIG. 4. The wireless performance test signal may be transmitted to test equipment such as data acquisition equipment 40.

At step 124, test equipment such as data acquisition equipment 40 may be used to convert the received wireless performance test signal into test data (e.g., into I/Q data samples that correspond to features of the test signal such as the amplitude and phase of the test signal).

At step 126, test equipment such as data acquisition equipment 40 and/or calibration computing equipment 42 may be used to determine whether the received wireless performance test signal is within an acceptable range of a known reference signal. The known reference signal may, for example, be the known calibration pattern generated by calibration pattern generator 34 as described above in connection with FIG. 3. Determining whether the received wireless performance test signal is within the acceptable range of the known reference signal may include comparing the test data to reference data (e.g., reference I/Q data samples) that is based on the known reference signal.

Figure 11:
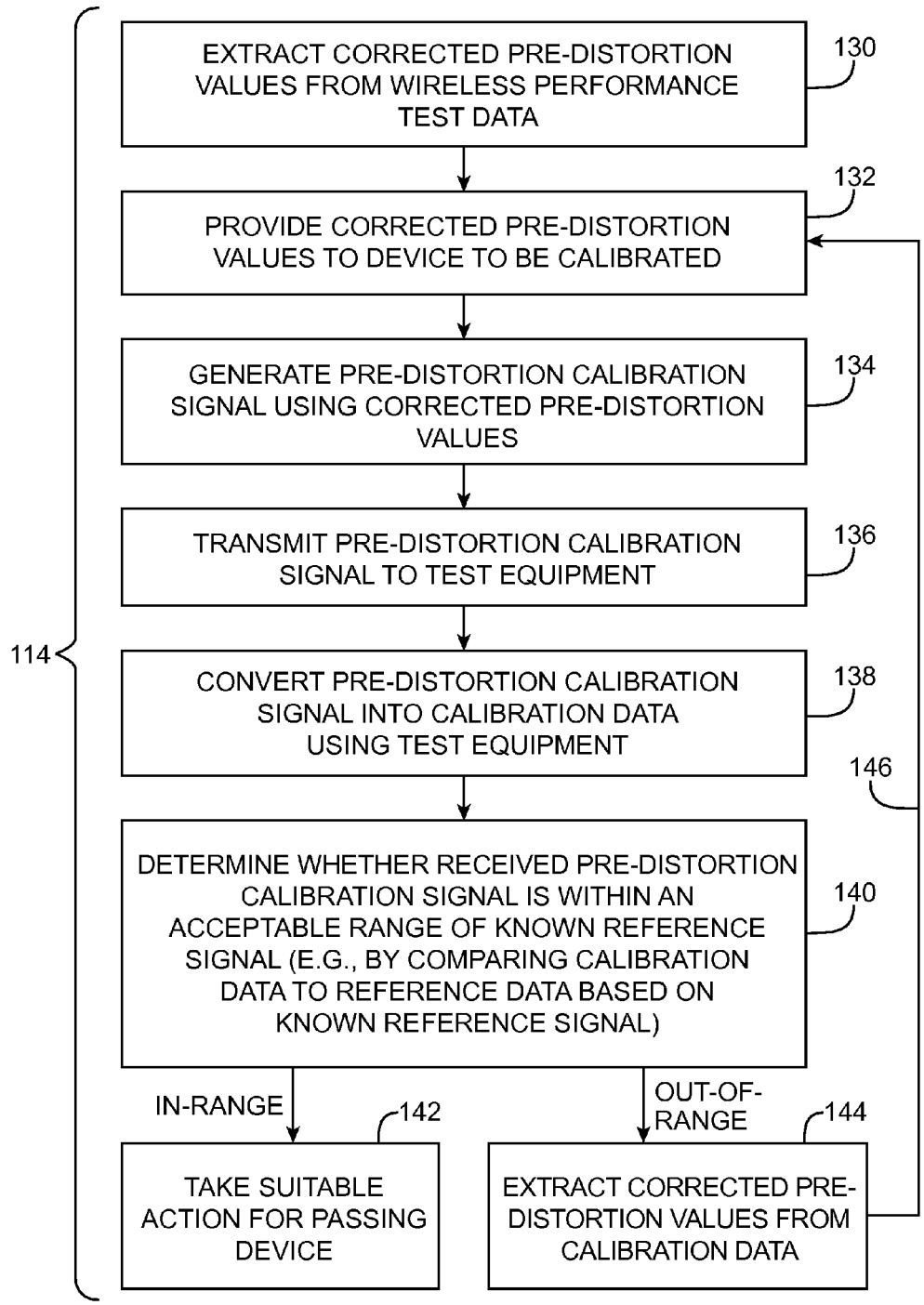
FIG. 11 is a flow chart of illustrative steps involved in performing iterative power amplifier performance calibration of electronic devices having wireless communications circuitry using initial pre-distortion calibration values in accordance with an embodiment of the present invention.

Illustrative steps that may be used in performing the iterative calibration operations described above in connection with step 114 of FIG. 9 are shown in FIG. 11.

At step 130, corrected pre-distortion calibration values such as corrected pre-distortion calibration coefficients may be extracted from the wireless performance test data described above in connection with FIG. 10. Extracting the corrected pre-distortion calibration values from the wireless performance test data may include generating a set of pre-distortion calibration coefficients that minimize the difference between the test data and the reference data described above in connection with FIG. 10.

If desired, extracting the corrected pre-distortion calibration values from the wireless performance test data may include extracting a relative local oscillator frequency drift correction from the wireless performance test data, removing a phase drift induced by the relative frequency drift from the wireless performance test data, and extracting the pre-distortion calibration values based on a comparison of the phase-drift-corrected wireless performance test data and the known calibration pattern generated by calibration pattern generator 34 of device 10.

At step 132, the extracted pre-distortion calibration values may be transferred from calibration computing equipment 42 to device 10 to be stored on device 10 and used by device 10 when generating wireless communications signals.

At step 134, wireless communications circuitry 16 in device 10 may be used to generate a pre-distortion calibration signal using the corrected pre-distortion calibration values (e.g., by pre-distorting a calibration signal having a known calibration pattern using the corrected pre-distortion calibration values prior to amplification of the calibration signal).

At step 136, wireless communications circuitry such as radio-frequency front end 38 and antenna 19 may be used to transmit the pre-distortion calibration signal to test equipment such as data acquisition equipment 40 of system 50.

At step 138, the received pre-distortion calibration signal may be converted into calibration data such as a set of digitized I/Q calibration data samples using, for example, data acquisition equipment 40.

At step 140, system 50 (e.g., calibration computing equipment 42) may be used to determine whether the received pre-distortion calibration signal is within the acceptable range of the known reference signal. The known reference signal may, for example, be the known calibration pattern generated by calibration pattern generator 34. Determining whether the pre-distortion calibration signal is within the acceptable range of the known reference signal may include comparing the calibration data to reference calibration data (e.g., reference I/Q data samples) that is based on the known reference signal.

If desired, the known calibration pattern used to generate the known reference signal to be compared with the calibration data may be the same as the known calibration pattern used to generate the known reference signal described above in connection with step 126 of FIG. 10. However, this is merely illustrative. If desired, multiple calibration patterns may be used to generate test and calibration signals to be used during various test and calibration steps for wireless calibration of device 10.

In response to determining that the calibration signal generated by device 10 using the corrected pre-distortion calibration values generated at step 130 is within the acceptable range of the known reference signal, calibration system 50 may proceed to step 142.

At step 142, suitable action may be taken for a passing device. Suitable action for a passing device may include terminating calibration operations and shipping device 10 to an end-user with the corrected pre-distortion calibration values stored in device 10.

In response to determining that the calibration signal generated by device 10 using the corrected pre-distortion calibration values generated at step 130 is outside the acceptable range of the known reference signal (i.e., that the calibration signal still includes an unacceptable amount of residual power amplifier induced signal distortion), calibration system 50 may proceed to step 144.

At step 144, an additional set of corrected pre-distortion calibration values may be extracted from the pre-distortion calibration signal generated at step 134 using the corrected pre-distortion values. The additional set of corrected pre-distortion calibration values may be further corrected pre-distortion calibration values that minimize the difference between the calibration data and the reference data.

As indicated by arrow 146, system 50 may then return to step 132 and perform another iteration of steps 132, 134, 136, 138, and 140. If desired, system 50 may perform multiple iterations of steps 132, 134, 136, 138, and 140 until the calibration signal generated using a current set of pre-distortion calibration values is within the acceptable range of the known reference signal or until a pre-determined maximum number of iterations have been performed.

Figure 12:
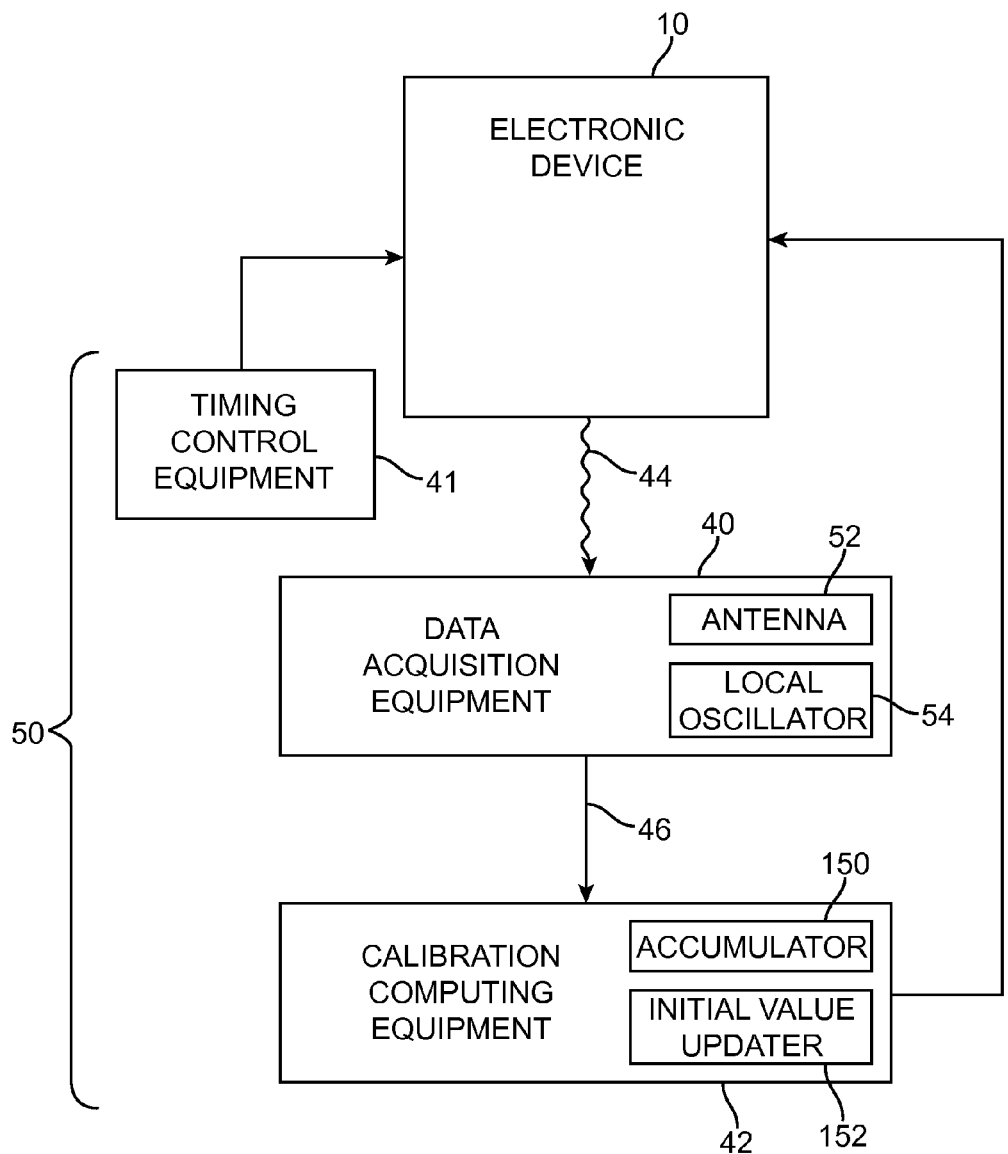
FIG. 12 is a diagram of an illustrative calibration system of the type shown in FIG. 4 showing how calibration computing equipment may include an accumulator and an initial value updater for periodically generating updated initial pre-distortion calibration values for a population of wireless electronic devices in accordance with an embodiment of the present invention.

FIG. 12 is a diagram showing how calibration computing equipment 42 of calibration system 50 may include additional components such as accumulating engine (accumulator) 150 and initial value updating engine (initial value updater) 152. Accumulator 150 and initial value updater 152 may be implemented using computing equipment that is coupled to computing equipment 42 using wired or wireless communications paths or that is implemented as an integrated portion of computing equipment 42 (e.g., separate computing circuitry and/or software applications running on microprocessor(s) associated with computing equipment 42).

If desired, accumulator 150 may be used to accumulate calibration information (e.g., corrected pre-distortion calibration values) for individual devices such as device 10 during calibration operations for a population of devices. Initial value updater 152 may be used to periodically generate a new, updated set of initial calibration values to be used during subsequent testing and calibration operations for devices in that population of devices. For example, initial value updater 152 may generate a new set of initial pre-distortion calibration values for a new generation of cell phones or a new generation of tablet computers using accumulated calibration information accumulated during calibration and testing of a previous generation of cell phones and/or tablet computers.

Figure 13:
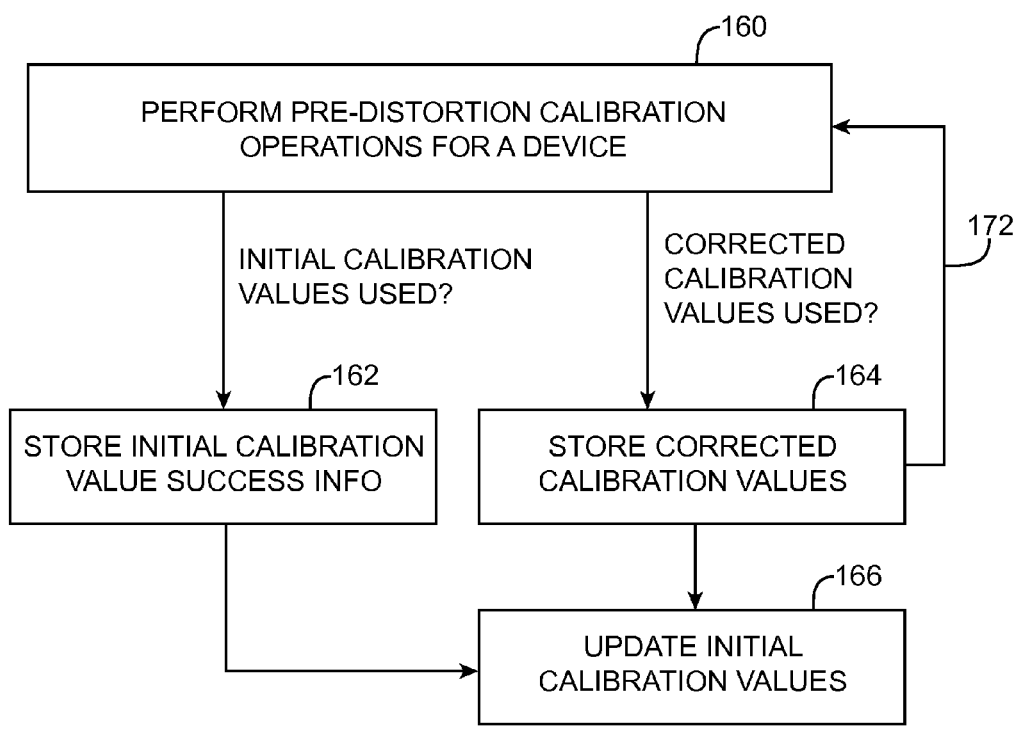
FIG. 13 is a flow chart of illustrative steps involved in periodically generating updated initial pre-distortion calibration values for a population of wireless electronic devices in accordance with an embodiment of the present invention.

Illustrative steps that may be used in periodically generating updated pre-distortion calibration values for a population of wireless electronic devices are shown in FIG. 13.

At step 160, pre-distortion calibration operations for a device such as device 10 may be performed using a calibration system such as calibration system 50.

In response to determining that initial pre-distortion calibration values are to be used during normal operations of the device to pre-distort wireless communications signals for that device, system 50 may proceed to step 162.

At step 162, accumulator 150 may be used to store calibration information such as initial calibration success information. Initial calibration success information may include a count of devices for which initial pre-distortion calibration values are to be used in pre-distorting wireless communications signals during normal operation of the device.

In response to determining that corrected pre-distortion calibration values are to be used during normal operations of the device to pre-distort wireless communications signals for that device, system 50 may proceed to step 164.

At step 164, accumulator 150 may be used to store calibration information such as the corrected pre-distortion calibration values for that device.

At step 166, initial value updater 152 may use the stored initial calibration value success information and/or the stored corrected calibration values accumulated by accumulator 150 to periodically generate an updated set of initial pre-distortion calibration values to be used in calibration and testing operations of the type described above in connection with, for example, FIG. 7.

The foregoing is merely illustrative of the principles of this invention and various modifications can be made by those skilled in the art without departing from the scope and spirit of the invention.

What is claimed is:

1. A method of using a calibration system to calibrate an electronic device that has wireless communications circuitry, wherein the wireless communications circuitry includes a power amplifier and wherein the calibration system includes data acquisition equipment and calibration computing equipment, the method comprising:
   with the calibration computing equipment, providing a set of initial pre-distortion calibration values to the electronic device, wherein the initial pre-distortion calibration values have been determined by observing power amplifier performance of a plurality of additional power amplifiers in a corresponding plurality of additional electronic devices;
   with the wireless communications circuitry, generating a test signal using the provided set of initial pre-distortion calibration values;
   with the power amplifier, amplifying the test signal;
   with the wireless communications circuitry, transmitting the amplified test signal to the data acquisition equipment; and
   with the calibration computing equipment, determining whether the amplified test signal is within a predetermined range of a reference signal, wherein observing the power amplifier performance of the plurality of additional power amplifiers comprises:
      obtaining wireless performance data for the plurality of additional electronic devices; and
      obtaining the set of initial pre-distortion calibration values based on the obtained wireless performance data for the plurality of additional electronic devices.

2. The method defined in claim 1 further comprising:
   in response to determining that the amplified test signal is within the predetermined range of the reference signal, terminating calibration operations.

3. The method defined in claim 1 further comprising:
   in response to determining that the amplified test signal is outside of the predetermined range of the reference signal, extracting a set of corrected pre-distortion coefficients from the amplified test signal.

4. The method defined in claim 3, further comprising:
   with the calibration computing equipment, providing the corrected pre-distortion coefficients to the electronic device.

5. The method defined in claim 4, further comprising:
   with the wireless communications circuitry, generating a calibration signal using the provided set of corrected pre-distortion calibration values.

6. The method defined in claim 5, further comprising:
   with the wireless communications circuitry, transmitting the calibration signal to the data acquisition equipment.

7. The method defined in claim 6, further comprising:
   with the calibration computing equipment, determining whether the calibration signal is within the predetermined range of the reference signal.

8. The method defined in claim 7 further comprising:
   in response to determining that the calibration signal is within the predetermined range of the reference signal, storing the corrected pre-distortion calibration values using the wireless communications circuitry.

9. The method defined in claim 1 wherein the wireless communications circuitry comprises a calibration pattern generator and a local oscillator and wherein generating the test signal using the provided set of initial pre-distortion calibration values comprises:
   with the calibration pattern generator, generating a known calibration pattern;
   with the local oscillator, generating a carrier signal; and
   with the wireless communications circuitry, modulating the carrier signal with the known calibration pattern.

10. The method defined in claim 9 wherein the wireless communications circuitry further comprises a pre-distortion compensator and wherein generating the test signal using the provided set of initial pre-distortion calibration values further comprises:
   with the pre-distortion compensator, pre-distorting the carrier signal that has been modulated with the known calibration pattern using the provided set of initial pre-distortion calibration values.

11. The method defined in claim 10 wherein amplifying the test signal comprises:
   with the power amplifier, amplifying the pre-distorted carrier signal that has been modulated with the known calibration pattern.

12. A calibration system for wireless communications calibration of an electronic device, comprising:
   calibration computing equipment configured to provide a set of initial pre-distortion calibration values to the electronic device;
   data acquisition equipment configured to receive a wireless signal that has been pre-distorted by the electronic device using the provided set of initial pre-distortion calibration values; and
   a waveform generator configured to generate a calibration pattern, wherein the calibration computing equipment is configured to generate the set of initial pre-distortion calibration values using additional wireless signals that include the calibration pattern.

13. The calibration system defined in claim 12 wherein the data acquisition equipment comprises at least one antenna for receiving the wireless signal and wherein the data acquisition equipment is configured to convert the wireless signal into data values and to provide the data values to the calibration computing equipment.

14. The calibration system defined in claim 13 wherein the electronic device further comprises a power amplifier, wherein the power amplifier induces amplifier distortion in the pre-distorted wireless signal, and wherein the calibration computing equipment is configured to generate a set of corrected pre-distortion calibration values for the electronic device using the provided data values and known reference data that is stored in the calibration computing equipment.

15. A method for obtaining pre-distortion coefficients for a population of wireless electronic devices, the method comprising:
    obtaining a set of initial pre-distortion calibration coefficients for the population of wireless electronic devices;
    providing the set of initial pre-distortion calibration coefficients to a plurality of wireless electronic devices in the population of wireless electronic devices;
    obtaining a set of pre-distortion coefficients for each of the plurality of wireless electronic devices in the population of wireless electronic devices using the provided set of initial pre-distortion calibration coefficients;
    accumulating calibration information associated with the obtained set of pre-distortion coefficients for each of the plurality of wireless electronic devices in the population of wireless electronic devices; and
    updating the set of initial pre-distortion calibration coefficients for the population of wireless electronic devices.

16. The method defined in claim 15 further comprising:
    providing the updated set of initial pre-distortion calibration coefficients to a plurality of additional wireless electronic devices in the population of wireless electronic devices; and
    obtaining a set of pre-distortion coefficients for each of the plurality of additional wireless electronic devices in the population of wireless electronic devices using the provided updated set of initial pre-distortion calibration coefficients.

17. The method defined in claim 15 wherein obtaining the set of pre-distortion coefficients for each of the plurality of wireless electronic devices in the population of wireless electronic devices using the provided set of initial pre-distortion calibration coefficients comprises:
    generating a test signal using each of the plurality of wireless electronic devices in the population of wireless electronic devices; and
    determining whether the test signal is within a pre-determined range of a known reference signal.

18. The method defined in claim 17 wherein accumulating the calibration information associated with the obtained set of pre-distortion coefficients for each of the plurality of wireless electronic devices in the population of wireless electronic devices comprises:
    in response to determining that the test signal generated by a particular one of the plurality of wireless electronic devices is within the pre-determined range of the known reference signal, storing information associated with the provided set of initial pre-distortion calibration coefficients.

19. The method defined in claim 17 wherein accumulating the calibration information associated with the obtained set of pre-distortion coefficients for each of the plurality of wireless electronic devices in the population of wireless electronic devices comprises:
    in response to determining that the test signal generated by a particular one of the plurality of wireless electronic devices is outside the pre-determined range of the known reference signal, generating a set of corrected pre-distortion calibration coefficients for that wireless electronic device; and
    storing the information associated with the set of corrected pre-distortion calibration coefficients.

20. The method defined in claim 19, wherein generating the set of corrected pre-distortion calibration coefficients comprises:
    extracting the set of corrected pre-distortion values from the test signal generated by that wireless electronic devices.

21. The method defined in claim 15 wherein obtaining the set of initial pre-distortion calibration coefficients for the population of wireless electronic devices comprises:
    generating a plurality of amplified test signals using a corresponding plurality of power amplifiers to be used in the population of wireless electronic devices.

22. The method defined in claim 21 wherein obtaining the set of initial pre-distortion calibration coefficients for the population of wireless electronic devices further comprises:
    computing an average test signal from the plurality of amplified test signals that have been generated using the corresponding plurality of power amplifiers; and
    determining the set of initial pre-distortion calibration coefficients using the computed average test signal.

23. The method defined in claim 22 wherein obtaining the set of initial pre-distortion calibration coefficients for the population of wireless electronic devices further comprises:
    extracting parametric characteristics from the plurality of amplified test signals that have been generated using the corresponding plurality of power amplifiers; and
    modifying each amplified test signal in the plurality of amplified test signals using the parametric characteristics extracted from that amplified test signal.

* * * * *